United States Patent [19]

Gascoigne

[11] 4,012,584
[45] Mar. 15, 1977

[54] APPARATUS FOR MAKING A SCREEN REPRODUCTION OF AN IMAGE

[75] Inventor: Richard M. Gascoigne, Esher, England

[73] Assignee: Crosfield Electronics Limited, London, England

[22] Filed: Jan. 29, 1975

[21] Appl. No.: 545,179

[30] Foreign Application Priority Data

Jan. 30, 1974 United Kingdom .............. 4250/74

[52] U.S. Cl. .............................. 358/302; 358/299
[51] Int. Cl.² ...................... H04N 5/86; G11B 7/08
[58] Field of Search ....... 178/6.6 DD, 6.6 B, 6.6 R, 178/6.7 R; 340/173 LS

[56] References Cited

UNITED STATES PATENTS

| | | | |
|---|---|---|---|
| 3,657,472 | 4/1972 | Taudt | 178/6.7 R |
| 3,725,574 | 4/1973 | Gast | 178/6.7 R |
| 3,767,850 | 10/1973 | McMillian | 178/6.7 R |
| 3,795,013 | 2/1974 | McKinley | 178/6.7 R |
| 3,878,559 | 4/1975 | Dugsley | 178/6.7 R |
| 3,886,308 | 5/1975 | Costello | 178/6.6 R |

*Primary Examiner*—Raymond F. Cardillo, Jr.
*Assistant Examiner*—Alan Faber
*Attorney, Agent, or Firm*—Toren, McGeady and Stanger

[57] ABSTRACT

In apparatus for making a half-tone reproduction of an image and having a row of light source elements which together expose a line across a component screen area of a film to be exposed, screen-representing signals are electronically generated when pulses exist in corresponding locations of a pair of shift register devices having trains of pulses moving in opposite directions. Each shift register device may comprise a pair of shift registers having trains of pulses moving in the same direction, the relative phase of the pulse trains in the two shift registers varying with the picture signal.

8 Claims, 17 Drawing Figures

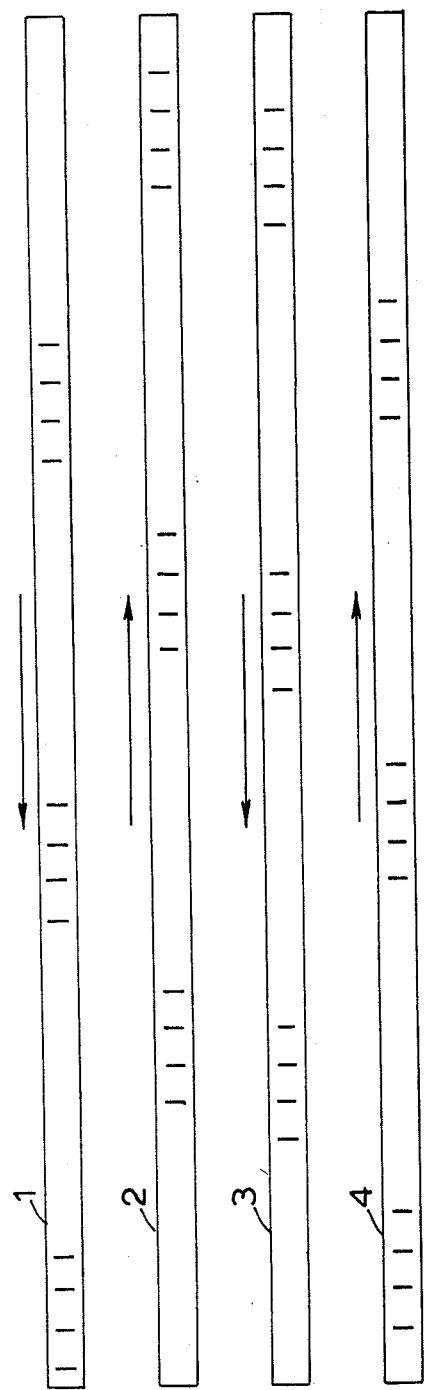
FIG. 5.
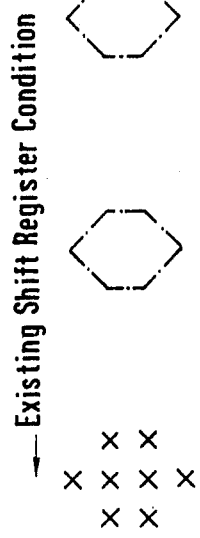
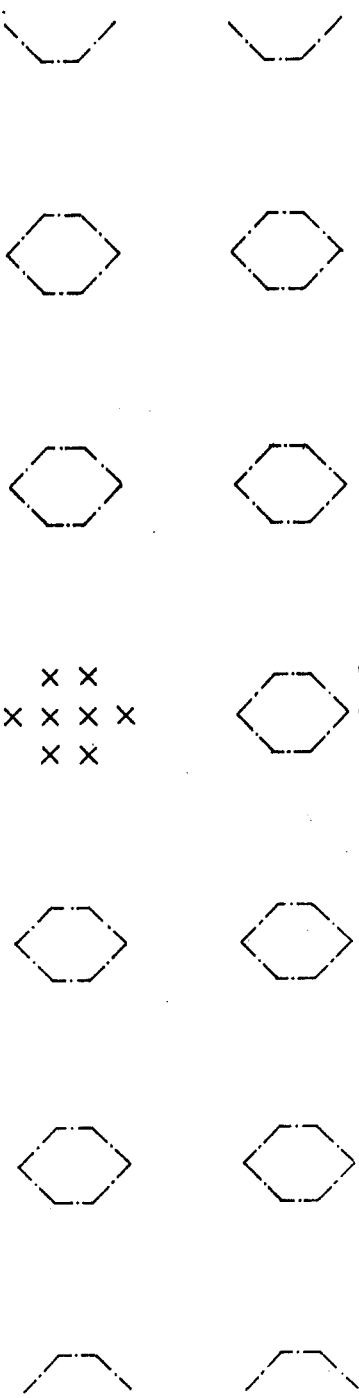
FIG. 6.

APPARATUS FOR MAKING A SCREEN REPRODUCTION OF AN IMAGE

For making a half-tone reproduction of an image, it is known to form each dot of the half-tone reproduction by means of a number of light source elements arranged in a row in an exposing head, the row of elements when all illuminated directing a line of light across the width of a scanning pitch on a light-sensitive medium to be exposed, the exposed area being then extended in the direction perpendicular to the said line of light, to form the dots, by relative movement between the said medium and the line of light which reaches its surface from the light source elements. The illumination of the light source elements is selectively controlled by electric signals, each of which is made up of the combination of an electronically generated screen-representing signal and a picture-representing signal, the picture-representing signal being common to all the light source elements for the period in which a single dot is being exposed. The screen-representing signals are such as would be produced by scanning a vignetted contact screen at a resolution much finer than that of the scanning raster.

According to the present invention, apparatus for making a screened reproduction includes a row of light source elements for exposing, in combination, a line across a component screen area of a sheet or plate to be exposed, and an electronic screened-image signal generator operative under the effect of an image-representing signal to control the illumination of the light source elements; the screened-image signal generator comprises a pair of shift register devices, each storage location in one shift register device having a corresponding storage location in the other shift register device, means for moving trains of one-representing signals along the two shift register devices in opposite directions, means responsive to an image-representing signal to vary the length of the trains of one-representing signals in the shift register devices, means responsive to the presence of one-representing signals in both storage locations of a pair of corresponding locations in the two shift register devices to develop a screened-image signal for that pair of locations, means for achieving relative movement between the said light source elements on the one hand and the sheet or plate on the other hand in a direction at an angle to the said line across the component screen area, in synchronism with the movement of the trains of signals along the two shift register devices, and means for applying resultant screened-image signals to the said light source elements during such relative movement whereby the component screen area of the sheet or plate is exposed line by line. Two pairs of shift register devices are employed to achieve an overall coverage of dots.

Each shift register device may consist of a pair of shift registers, means for moving trains of one-representing signals along the two shift registers in the same direction, means for varying the relative phase of the signal trains in these two shift registers, and means for detecting a predetermined relationship between the contents of the two shift registers. The effective data signal in such a shift register device can be considered as the exclusive-OR output of the two shift registers, the resultant being compared, location by location, with the exclusive-OR output of another pair of shift registers with pulse trains moving in a direction opposite to that of the first pair and means for varying their relative phase. The advantage of altering the relative phase of the pulse trains in the two shift registers in which the signals move in the same direction to alter the mark-space ratio of the exclusive-OR output is that the change in the output of the shift register device (including two shift registers) takes place immediately along the whole length of the shift register device.

The shift rates along the two shift register devices are not necessarily the same; they will vary for different screen angles.

It will be realised that the expression "one-representing signal" in the above is intended only to indicate a predetermined significant condition of a shift register location and can in fact be either of the two possible conditions of that location.

It should also be realised that the screen-component area referred to may represent a complete "dot" of the screen (or as much of the dot as is required by the image-representing signal) or it may indicate a predetermined fraction of the dot, for example a half dot, the remaining half being exposed in a subsequent passage of the light source elements.

The invention is particularly suitable when the number of light source elements is large. However, it can also be used with advantage for an exposing head in which there is a smaller number of light source elements but in which intensity variation of the illumination produced by each of these elements is required. In the latter case, the outputs from the shift registers may be grouped in sets of five, for example, each group providing a resultant light output proportional to the number of individual shift registers pair outputs in the group in question.

In order that the invention may be better understood, the underlying principle and a method and apparatus embodying the invention will now be described with reference to the accompanying drawings, in which:

FIGS. 1–8 illustrate the underlying principle of the invention, FIGS. 1, 3, 5 and 7 illustrating combinations of shift registers containing trains of one-representing signals, and FIGS. 2, 4, 6 and 8 illustrating respectively screen-representing patterns produced by the pulse trains of FIGS. 1, 3, 5 and 7;

Before describing the drawings in detail, we wish it to be clear that although we have shown shift registers with a capacity for several pulse trains and although we have illustrated the action of the shift registers by indicating a number of dot pattern areas below the shift registers, in practice the screen component area produced at any time is only a single dot pattern or part of a dot pattern and the shift registers need only be long enough to hold a single pulse train. Furthermore, in practice the number of elements in a unit screen area would be much larger than that shown in the accompanying drawings.

Figure 1:
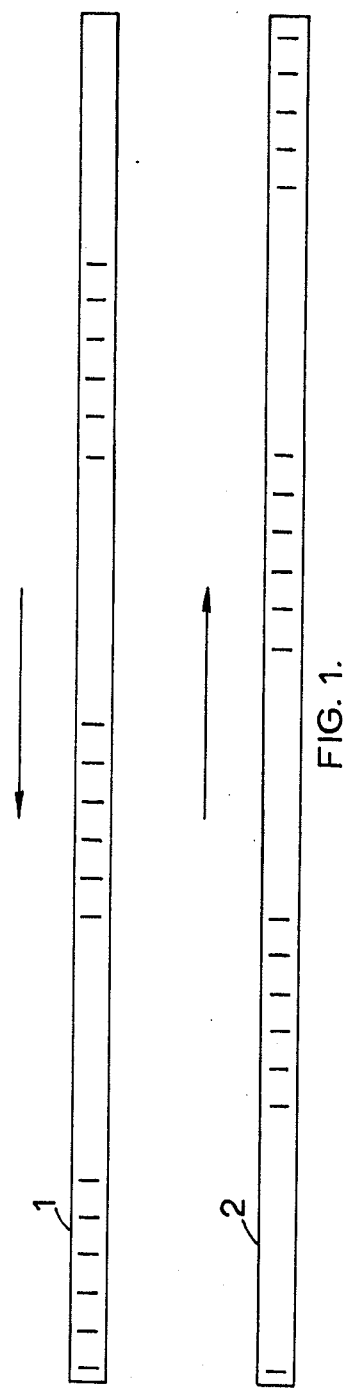
Figure 2:
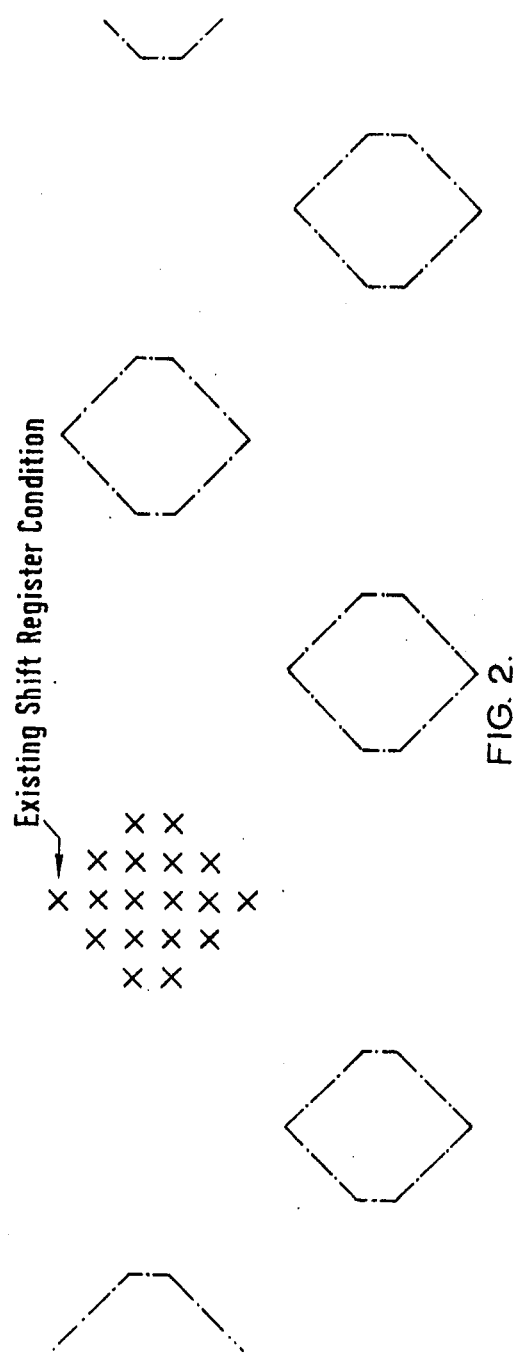

Considering first FIGS. 1 and 2 of the accompanying drawings, shift registers 1 and 2 are each provided with a pattern of three trains of six one-representing signals separated by trains of zero-representing signals, as indicated in FIG. 1. In the example described, the shift registers are of the circular kind. As indicated by the arrows, the contents of these two shift registers are moved in opposite directions. This movement takes place at the same speed in both shift registers. For each storage location in a shift register there is an individual light source element and where corresponding storage locations of the two shift registers both contain one-representing signals, the corresponding exposing light source is turned on. The result of this is that the exposure pattern shown in FIG. 2 is produced on a light-sensitive medium exposed to these light sources. Successive horizontal lines represent the result of one bit movement of each shift register, this being accompanied by relative movement of the light-sensitive medium and the exposing light sources to produce displacement of the exposed lines perpendicular to the direction of these lines. Each group of crosses in FIG. 2 represents an exposed dot on the light-sensitive medium.

Figure 3:
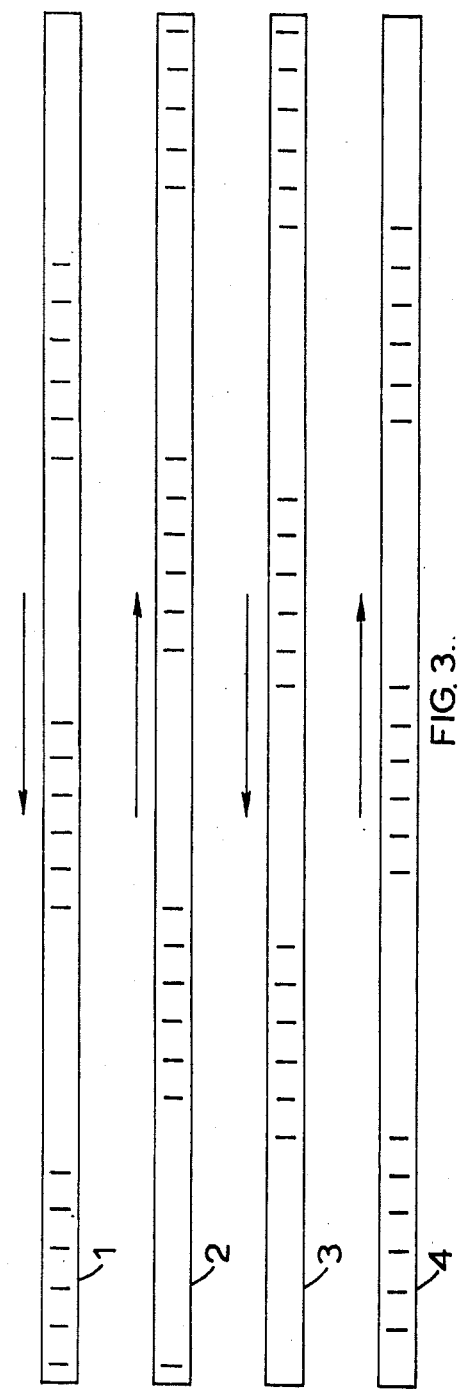
Figure 4:
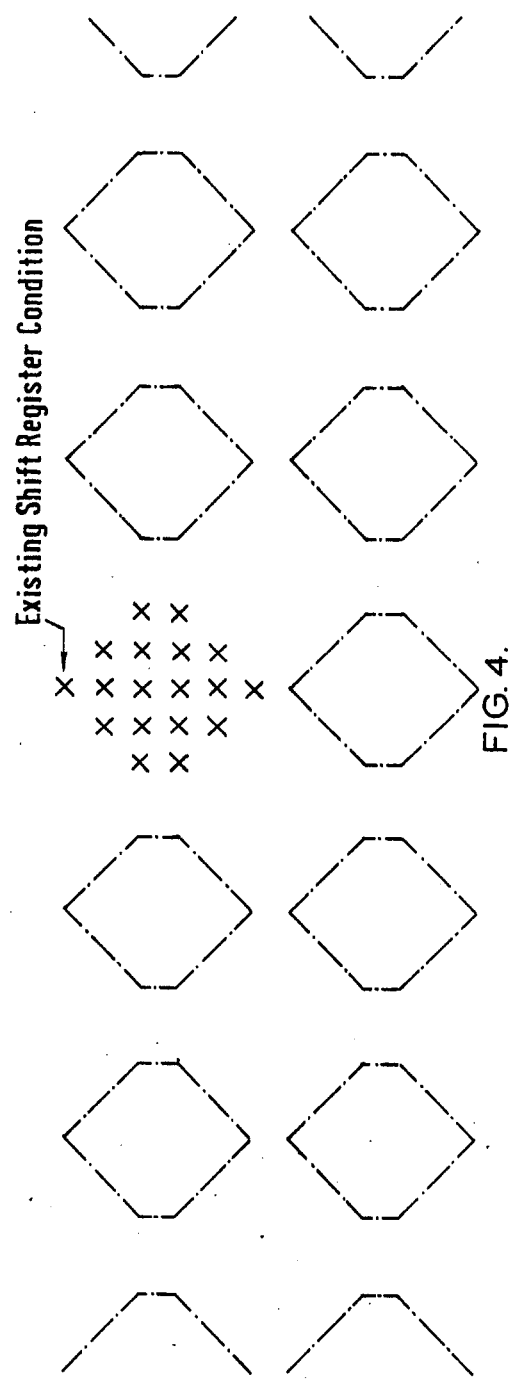

The spaces between the dots in FIG. 2 can be filled by providing a second pair of shift registers, as indicated in FIGS. 3 and 4. The second pair of shift registers 3 and 4 produces a pattern similar to that of FIG. 1, but displaced to one side. Thus, FIG. 4 can be said to represent the OR function of these two patterns. As shown, the pattern of FIG. 4 provides a 50% dot at a conventionally defined screen angle of 90°. In practice, longer pulse trains would be used in order to provide better definition of the dot structure.

Figure 7:
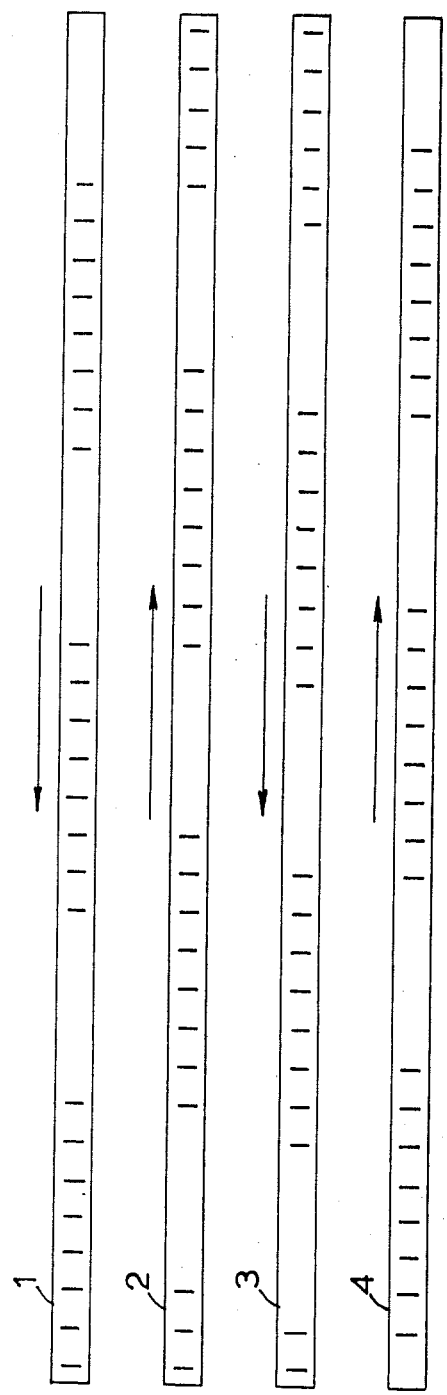
Figure 8:
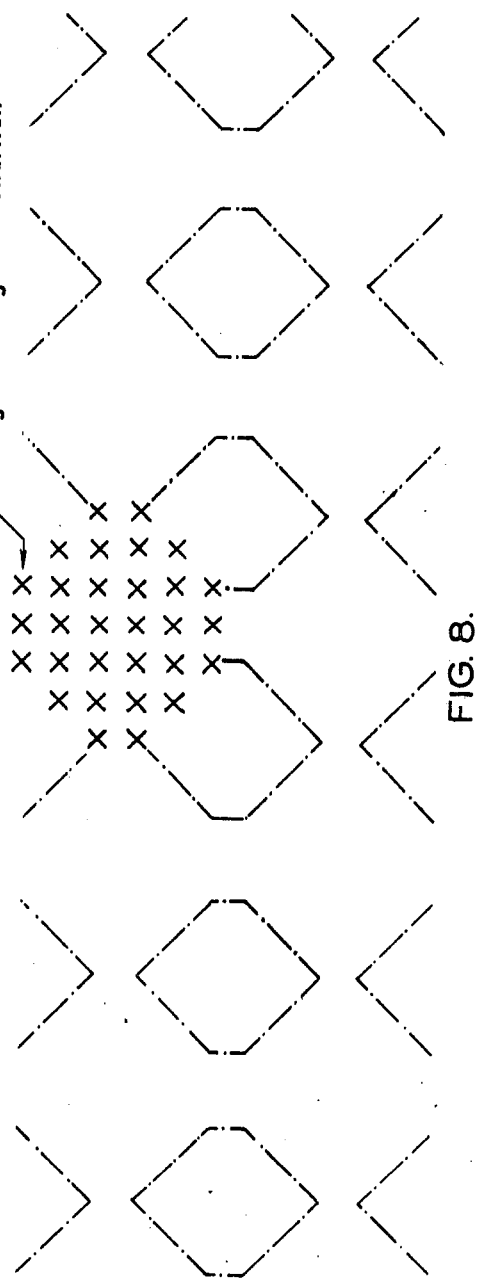

If the mark-space ratio of the trains of one-representing and zero-representing signals is changed in each shift register while retaining the same repetition rate of the pulse trains along the shift registers, different percentages of dot coverage will be obtained. Thus, in FIG. 5 in each shift register trains of four one-representing signals are separated by trains of eight zero-representing signals. The result of this on the exposure pattern is indicated in FIG. 6. The dot patterns occur with the same frequency in both directions but are reduced in size. FIGS. 7 and 8 show the result of altering the mark-space ratio in the reverse direction (trains of eight one-representing signals). It will be seen that in this case the dot coverage is greatly increased.

Figure 9:
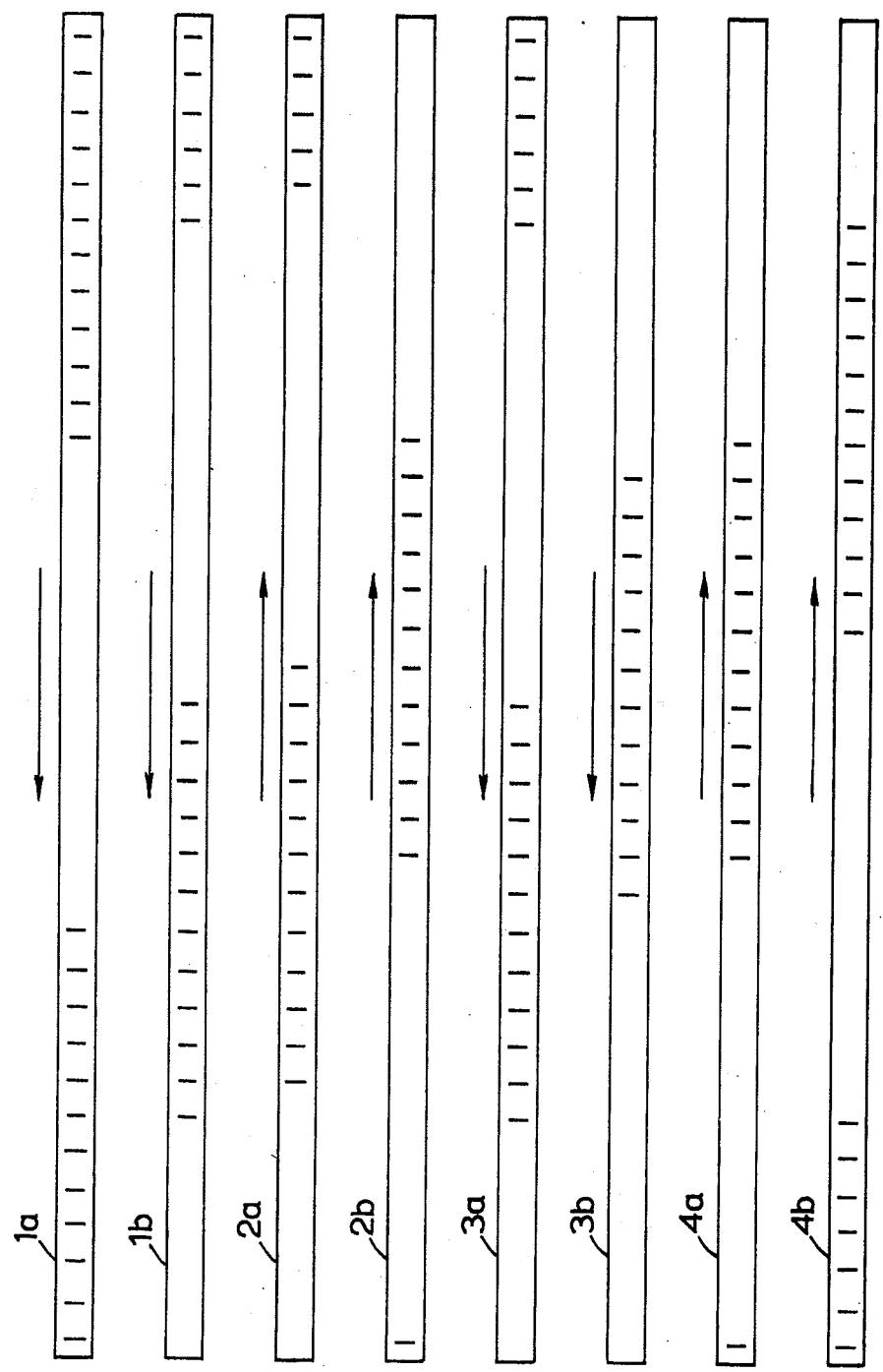
FIGS. 9, 10 and 11 illustrate combinations of eight shift registers, used in apparatus embodying the present invention.
Figure 10:
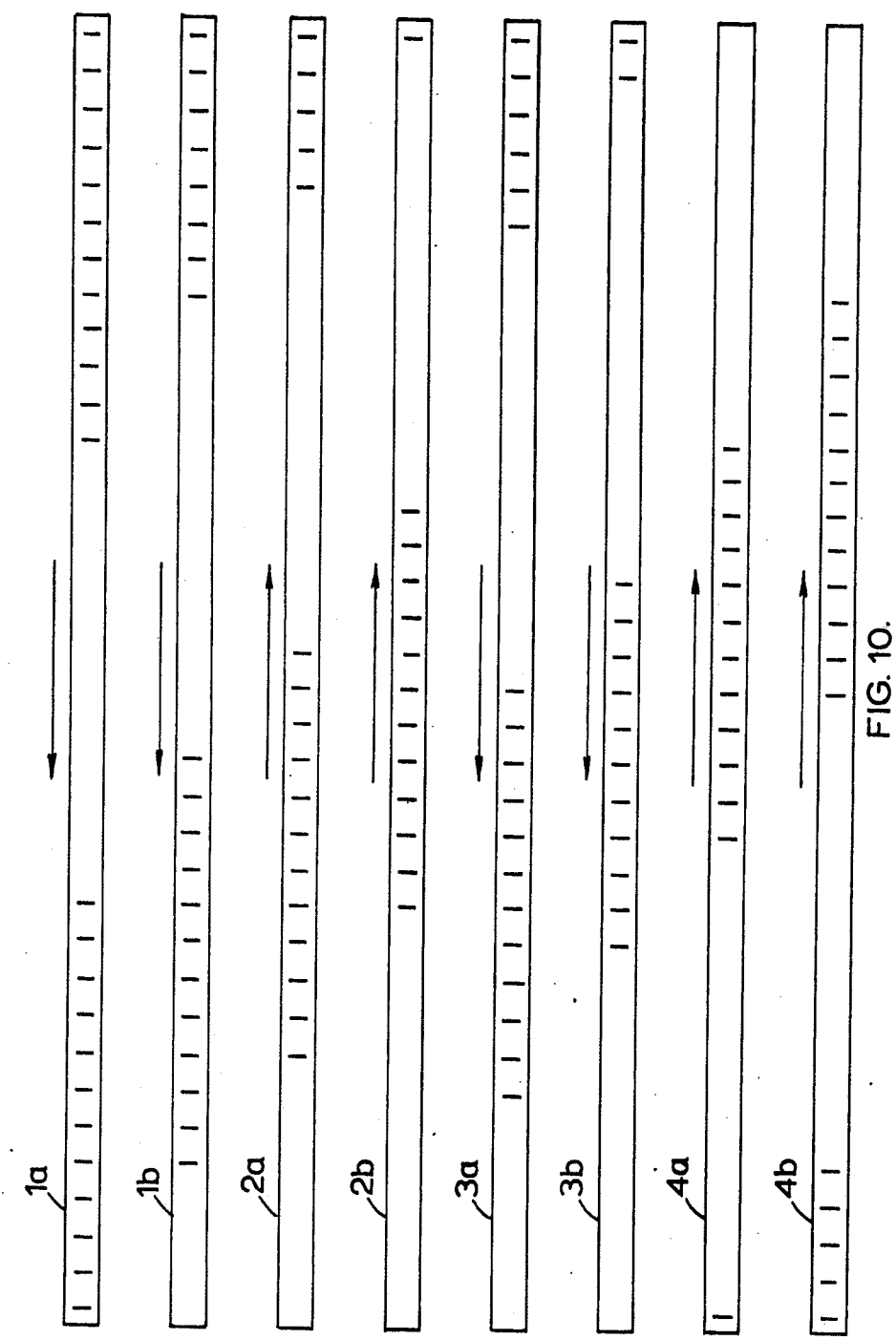
Figure 11:
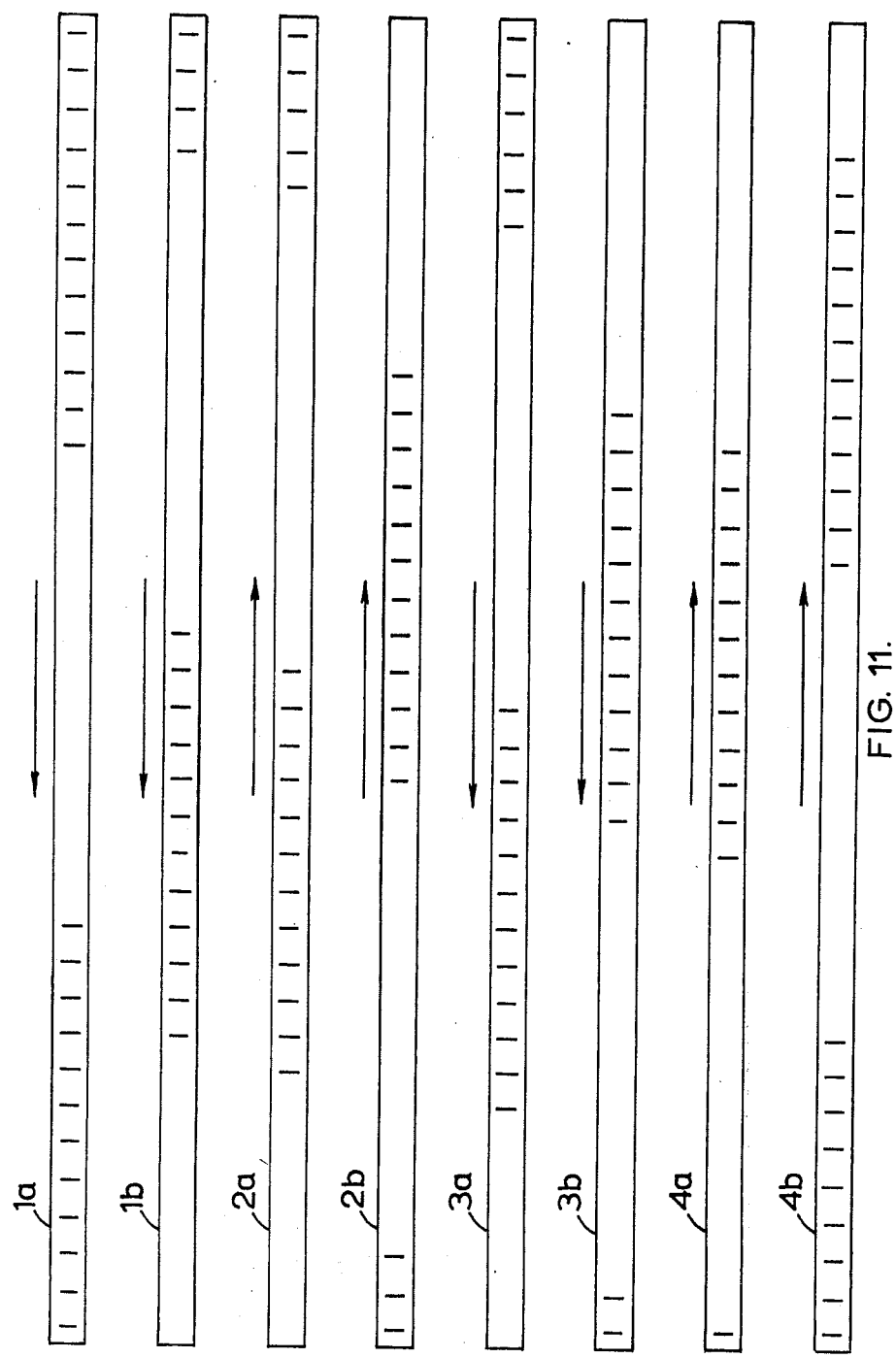

As previously indicated, the necessity for altering the mark-space ratio of the one-representing and zero-representing signals in the shift registers can be avoided by using pairs of shift registers in place of each of the shift registers used in the preceding arrangements. In FIG. 9, the shift registers 1a and 1b correspond to the first of the shift registers in the arrangement of FIGS. 3, 5 and 7. These two shift registers form part of a single shift register device capable of producing the required trains of signals of variable mark-space ratio. The signals travel along the two shift registers in the same direction but with variable relative phases and the required output of the shift register device is obtained by combining the conditions of shift registers 1a and 1b in an exclusive-OR manner. For the conditions shown in FIG. 9, the output of the exclusive-OR device consists of trains of six one-representing signals separated by trains of six zero-representing signals, and is thus similar to the output of the first shift register in FIG. 3. By a relative shift or two locations between the two shift registers, however, the output of the exclusive-OR circuit becomes that of the first shift register in FIG. 5. The remaining six shift registers 2a, 2b, 3a, 3b and 4a, 4b of FIG. 9 are used in pairs in the same way to provide exclusive-OR resultant signals which are then used in the same manner as the outputs of the second, third, and fourth shift registers of FIGS. 3, 5 and 7. The relative phases required to simulate the conditions of FIGS. 5 and 7 are shown in FIGS. 10 and 11 respectively.

Figure 12:
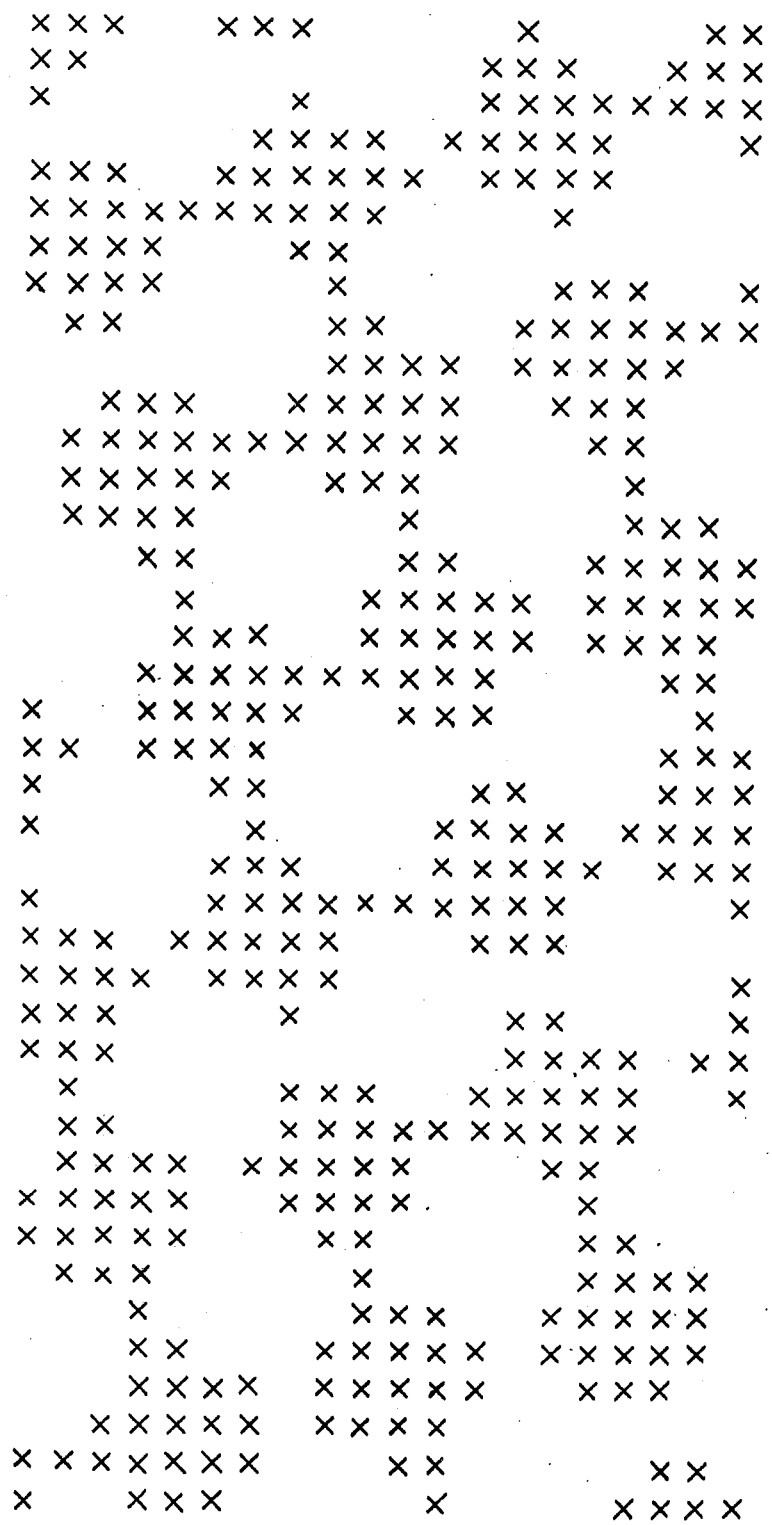
FIG. 12 illustrates a 15° screen pattern which can be produced by apparatus embodying the invention.

Screen angles other than 90° are achieved by changing the shift rates for the shift registers and the lengths of the pulse trains in each of the eight shift registers, in order to keep the same screen rulings. In general the shift rate for the left-moving shift register will be different from the right-moving shift register. An example of an approximately 15° screen is shown in FIG. 12.

Figure 13:
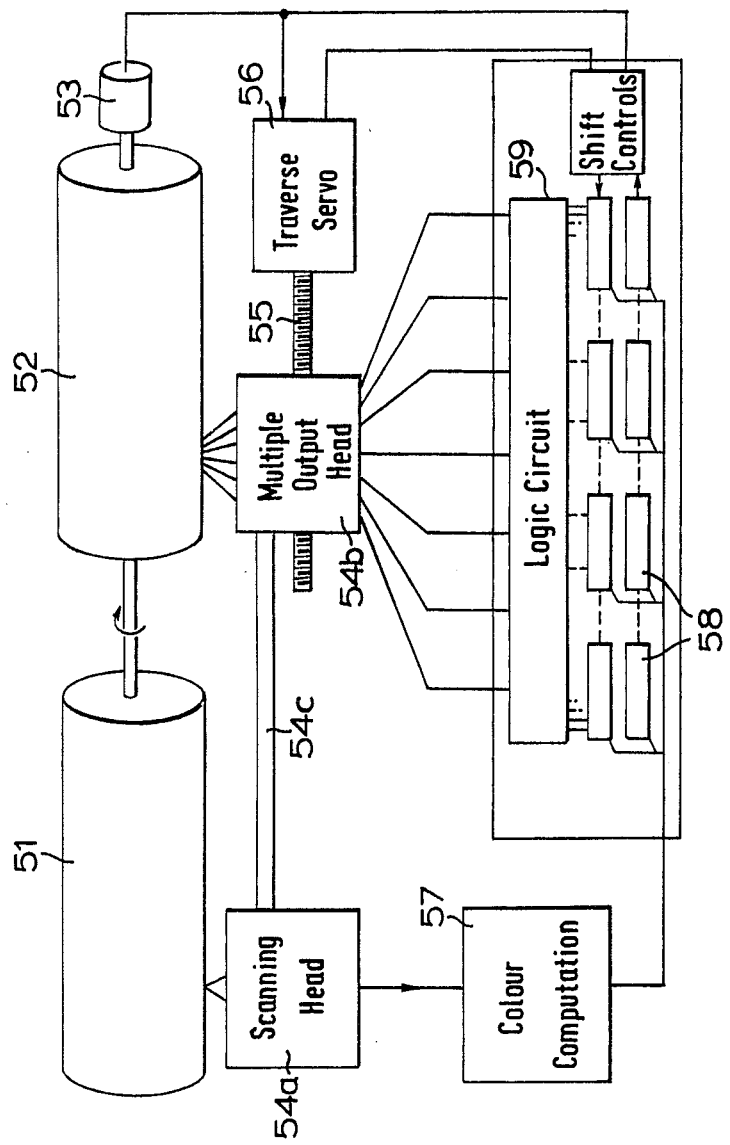
FIG. 13 shows diagrammatically a complete image-reproducing apparatus embodying the invention.

FIG. 13 is an overall block diagram showing how the screen pattern generator is used in an image reproducing apparatus. In FIG. 13, an input drum 51, an output drum 52 and a shaft transducer 53 are mounted on a common shaft. The input drum is scanned by an analysing head 54a and the output drum 52 is scanned by a multiple-output exposing head 54b. These two heads are mechanically coupled through a member 54c and move together along a lead screw 55 controlled by a traverse servo 56. The traverse servo is in turn controlled by pulses from the shaft transducer 53. The output of the scanning head 54a is applied to a colour computation unit 57, in which corrections are introduced in a manner known in itself, the output of the circuit 57 going to the shift register devices 58 to control the lengths of the trains of one-representing signals in these devices. Where each device consists of a pair of shift registers, the signal from the colour computation unit is used to adjust the relative phase of the trains of pulses travelling along the pair of shift registers, as explained above. The outputs from the storage locations in the shift registers are combined in logic circuit 59, of the kind to be described in connection with FIG. 14. The rate of stepping of the shift registers is controlled by signals from the transducer 53. Signals from the traverse servo 56 are also applied to the screen generator 50 for synchronisation purposes.

The signals from the logic circuit 59 control individual light source elements in the multiple output head 54b.

If desired, these light source elements can be apertures in a modulator illuminated by a common laser.

In FIG. 13 a mechanical connection is shown between the analysing scanning head 54a and the output 54b. Generally speaking, it would be desirable to make provision for enlargement of a reproduced image and to achieve this the mechanical connection would be broken and instead the scanning head 54a would be controlled by a traverse servo in turn controlled, through an enlargement selection device, from the transducer 53. The enlargement selection device would also control the rate of extraction of signals, derived from the analysing scanning head, from a store for application to the output head. Apparatus for carrying out enlargement in this manner is fully described in our U.S. Pat. No. 3,541,245.

Figure 14:
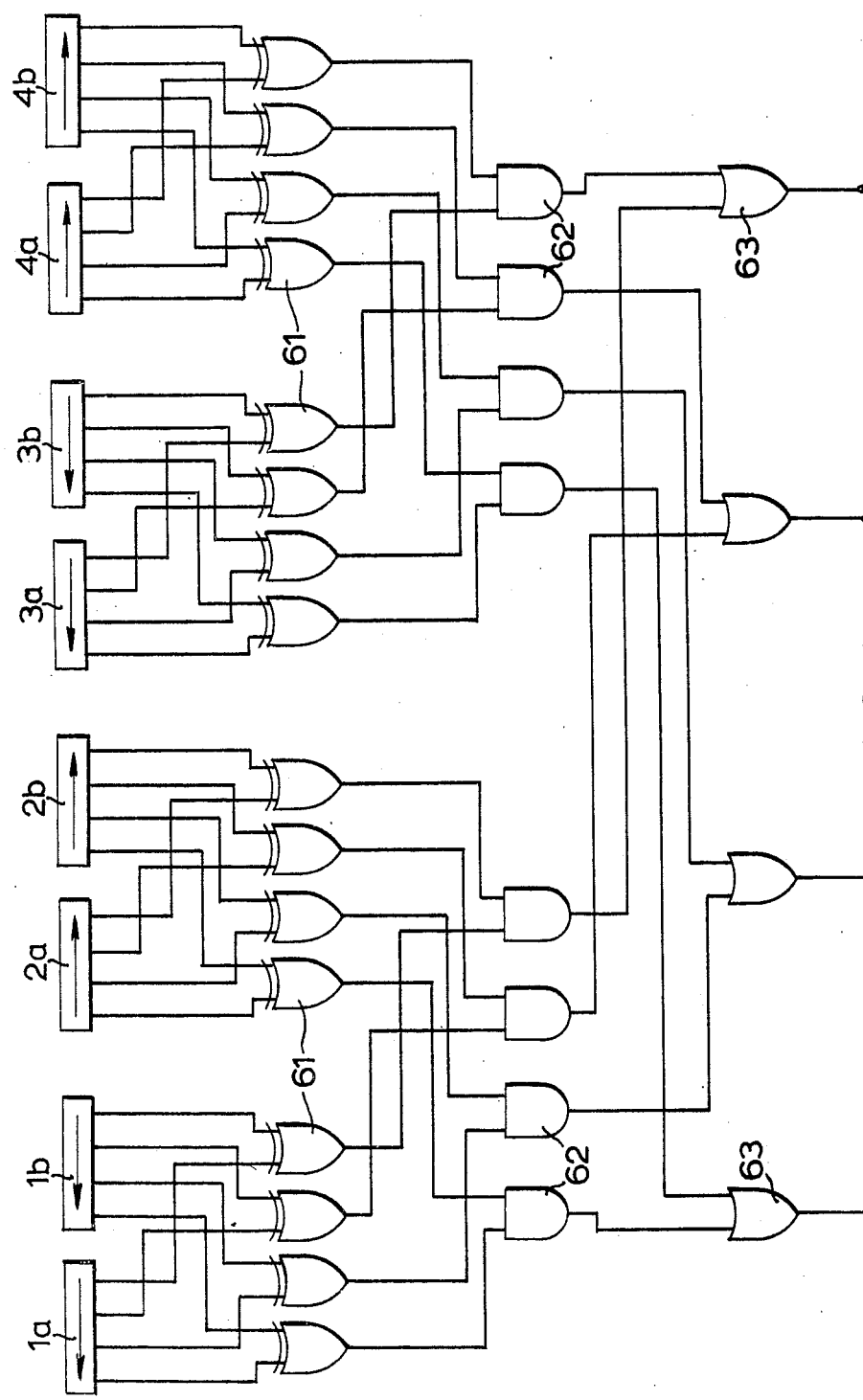
FIG. 14 is a logic diagram showing how the shift register outputs are combined.

The decoder for the apparatus for carrying the invention into effect in the manner illustrated by FIGS. 9, 10 and 11 is shown in FIG. 14 of the accompanying drawings. For simplicity, only four bit positions are shown in each of the shift registers 1a, 1b, 2a, 2b, 3a, 3b, 4a, and 4b, in which the arrows show the direction of shifting. Registers 1a and 3a shift left at a rate determined by the required screen angle and registers 2a and 4a shift at a rate also determined by the required screen angle. A rational system is one in which the screen angles have rational tangents and the dot centres lie on a grid consisting of a finite number of evenly spaced lines per unit length, the grid lines being parallel or perpendicular to the direction of scan, and in which the ratio of separations of dot centres lying on the same grid line for a screen of one colour separation to that for another colour separation is rational. An irradtional system is one in which the screen angles have irrational tangents and the ratio of separation of dot centres lying on the same grid line for a screen of one colour separation to that for another colour separation is irrational, the grid lines being parallel or perpendicular to the direction of scanning lines. The relationship between the shift left rate and shift right rate is a rational fraction if a screen angle having a rational tangent is required or an irrational fraction if a screen angle having an irrational tangent is required. Registers 1b, 2b, 3b and 4b shift at the same rates as registers 1a, 2a, 3a and 4a respectively but the phase relationship between registers in each pair is varied according to the picture level. The pulse trains for each shift register are the same and the mark-space ratio of the lengths of ones and zeroes is always 1:1. As shown in FIG. 14, exclusive-OR gates 61 receive the outputs from the locations or bit positions in adjacent shift registers of a pair and the outputs of the exclusive-OR gates 61 are applied to AND gates 62 which also receive the outputs from exclusive-OR gates connected to another pair of shift registers. Finally, the outputs of one AND gate from each half of the diagram are combined in an OR gate 63 to provide the illumination signal for a single light source element.

The pulse train length is determined by the screen ruling and screen angle required. For rational systems the length of the pulse train put into each shift register will be constant for the whole separation. For irrational systems, as defined above, the lengths of pulse trains will take on one of two values (these two being successive integers) the proportion of time for which each value is used being predetermined.

In the above description the number of values for the percentage dot is limited to the number of pulses in each pulse train used in the shift registers. However intermediate values, if required, can be obtained by causing the phase difference within pairs of shift registers to rapidly vary between two adjacent phase steps the proportion of time on each phase step determining the intermediate value required. For rational systems all the shift registers may be made circular so that once the pulse trains are set up no further generation of pulses is required. For irrational systems the pulse generators will require more complex logic.

Figure 15:
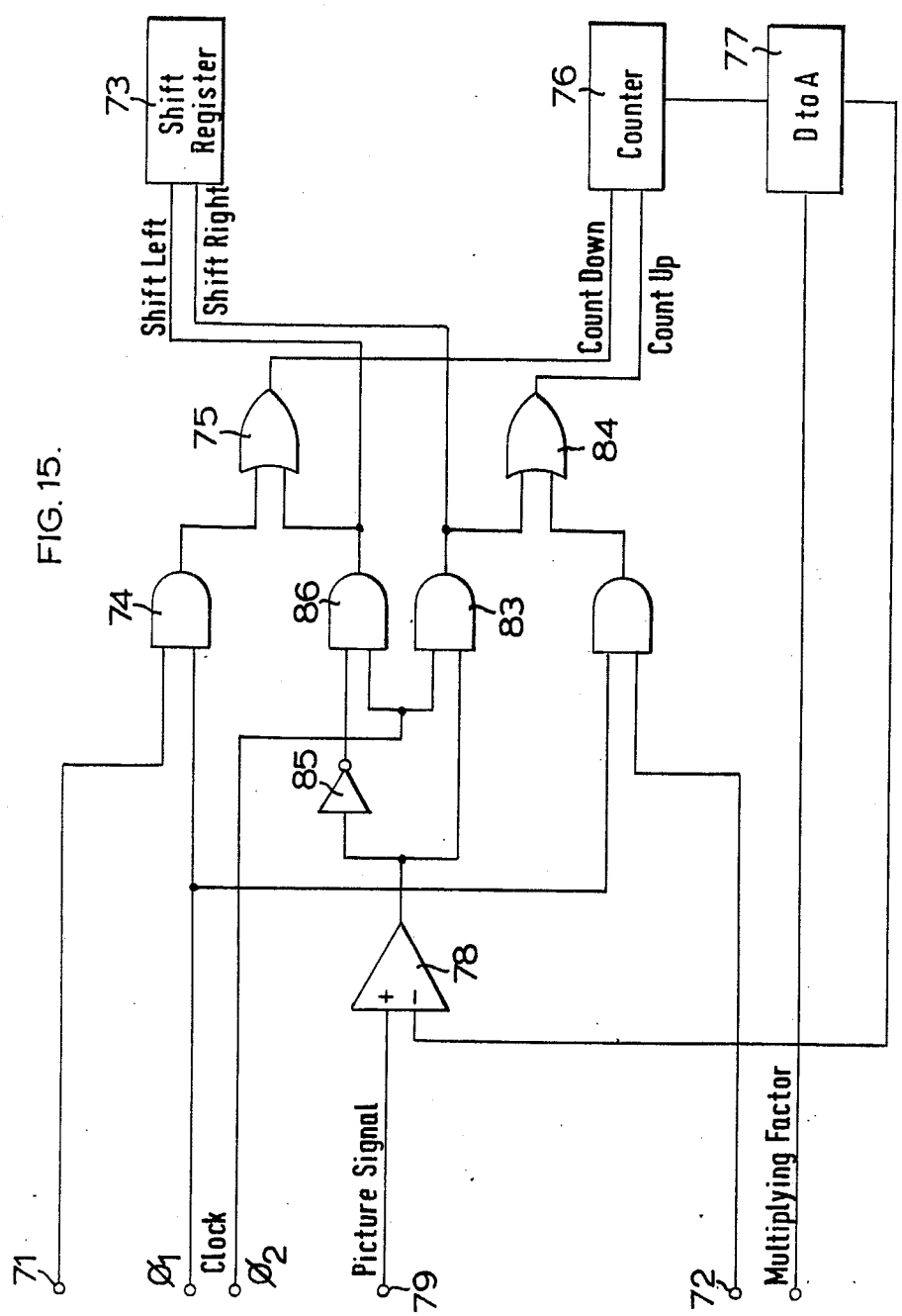
FIG. 15 is a circuit diagram showing how the picture signal affects the shift registers.

FIG. 15 shows the manner in which a picture signal is used to adjust the phase of a train of pulses in a shift register, and thereby the length of a train of illumination-control signals from the shift register device.

The principle of FIG. 15 is that between regular shift pulses, phase-altering shift pulses are derived by means of a counter, the value in which varies with the phase of the pulse train in the shift register, and a comparator which compares the counter output with the value of the picture signal.

In FIG. 15, regular shift pulses are applied either to terminal 71 or to terminal 72, according to whether the shift register 73 is a right-shifting register or a left-shifting register. In the following description, it will be assumed that the regular shift pulses are applied to terminal 71 and thence to AND gate 74.

Clock pulses $0_1$ and $0_2$ occur alternately at a frequency higher than the shift register frequency. The coincidence of a shift register pulse at terminal 71 and a clock pulse $0_1$ acts through AND gate 74 and an OR gate 75 to step a counter 76. The value in the counter is applied to a digital-to-analogue converter 77, the output of which is applied to a comparator 78 which receives the picture signal from terminal 79.

If the picture signal has remained unchanged, the stepping of the counter by 1 will result in an inequality at the comparator output which, on receipt of the next $0_2$ clock pulse, will act through AND gate 83 to shift the register through one place and also, through OR gate 84, to restore the counter to its original value.

If the picture signal had decreased in magnitude immediately prior to the coincidence of clock pulse $0_1$ and the shift pulse at 71 (requiring the phase of the shift register pulse train to be altered by one step in a direction contrary to the normal shifting direction), the decrease in picture value will have created an inequality at the comparator output. Clock pulse $0_1$ and shift pulse from terminal 71 again act to step the counter 76 but this merely restores equality at the comparator output and when clock pulse $0_2$ arrives no shift pulse is produced and the counter remains in its changed state.

If on the other hand the picture signal had increased immediately prior to clock pulse $0_1$ (requiring the phase of shift register to be altered by one step in the normal shifting direction), the change of picture signal will have resulted in an inequality at the comparator output. The arrive of the $0_1$ clock pulse and the shift pulse from terminal 71 steps the counter 76 and this increases the inequality at the output of comparator 78. When the next $0_2$ pulse arrives, a shift pulse will be generated which causes a right shift of one place in the register 73 and steps the counter up by one step towards equality with the picture signal. This reduces but does not clear the inequality at the comparator output. At the next $0_2$ pulse, the comparator output again acts through the gate 83 to generate a right-shift pulse and to step the counter up by one and this restores the equality between the counter output and the picture signal level.

If the change in magnitude of the picture signal required a phase shift of two places in the shift register, then three $0_2$ signals would cause phase displacements of one place, two of these representing the change in picture magnitude and the other the regular shift pulse.

When a left shift pulse is required by the comparator, the comparator output acts through inverter 85 and AND gate 86 and simultaneously steps the counter down through OR gate 75.

Figure 16:
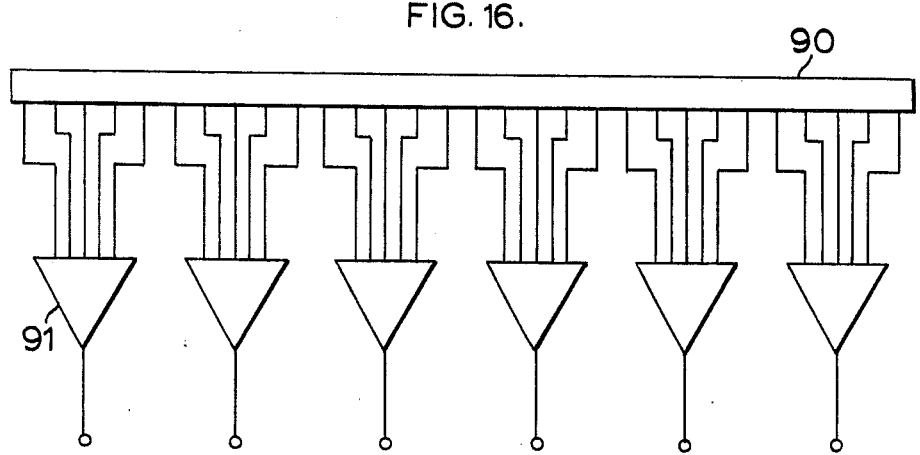
FIG. 16 illustrates the grouping of the logic circuit outputs to control a smaller number of light source elements.

As explained earlier, each light source element may produce a hard dot, that is to say a dot of uniform intensity, or a soft dot, that is to say one in which the intensity profile has sloping sides, decreasing towards the edges. A method of printing employing soft dots is disclosed in the co-pending application Ser. No. 533,460, filed Dec. 16, 1974 — Peter C. Pugsley, inventor. FIG. 16 shows a method of generating control signals for light source elements adapted to produce soft dots. In FIG. 16, the circuit 90 represents a logic block similar to that disclosed in FIG. 14 but providing 30 binary signals instead of four. These binary signals represent adjacent elements of a line across the screen-component area and are combined in groups of five to feed six operational amplifiers 91 with inputs having equal weightings. The outputs of these operational amplifiers are applied to the light source elements to control the intensity of light produced. In this example, each operational amplifier is capable of providing one of five discrete signal levels, or zero level, at any one time.

Figure 17:
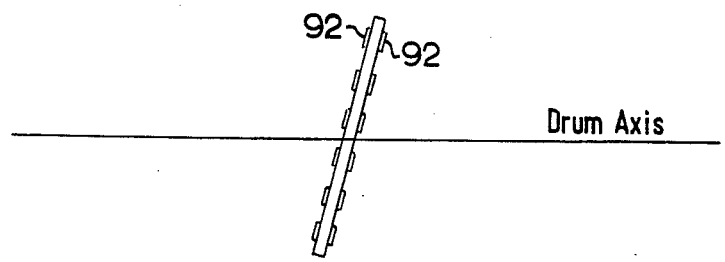
FIG. 17 shows the arrangement of a modulator for providing six light outputs.

FIG. 17 illustrates the arrangement of a modulator crystal in relation to the axis of a drum carrying a film to be exposed. The crystal has six pairs of electrodes and is arranged at an angle of $\tan^{-1} \frac{1}{4}$ to the vertical, so that light passing through the modulator crystal between adjacent pairs of electrodes 92 will fall on areas of the film which are offset in the direction of the drum axis. They will also be offset in a direction perpendicular to the drum axis (i.e., in the direction of movement of the film), but delays are applied to the signals in order to achieve correct positioning of the images on the film in this direction. The images produced by the electrode pairs in the arrangement of FIG. 17 overlap one another, as illustrated in the prior application Ser. No. 533,460, filed Dec. 16, 1974 — Peter C. Pugsley, inventor. The modulator crystal shown in FIG. 17 may be a crystal of ADP.

As stated above, the apparatus shown can be used for different screen angles by varying the relative shift rates of the pulse trains in the registers. However, for a screen angle of 45° there is a difficulty, namely that the required shift rate in one direction becomes infinite. To overcome this difficulty at this particular angle, the second shift register device can be effectively turned through 90° with respect to the first. The shift rate in the first is zero and the shift rate in the second is then one place for each step of relative movement of the light source elements and the film or plate, i.e., there is zero change in the shift register condition relative to the film or plate. Only one location of the second shift register is then considered. If this location contains a one-representing signal, then a screened-image signal is generated for each location of the first shift register device containing a one-representing signal. If the said location of the second shift register device does not contain a one-representing signal, then no screened-image signals are generated for that line of the film or plate.

One advantage of apparatus embodying the invention is that the phase shift produced by the image-representing signal causes a linear change in the size of the dot and the result is that the area change is smaller in the region of the 0% dot and the 100% dot than it is for a 50% dot. This is found to be better because the response of the eye is such that it needs smaller steps at 0% than at 50%, and smaller steps at 100% dot are better when the image is required for taking negatives.

As an example of the pulse lengths necessary to provide screens at different angles, for a 90° screen, each shift register could contain 120 one-representing signals and 120 zero-representing signals. For screen angles of 15° and 75°, for all shift registers shifting in one direction, there would be $120 \sqrt{2}$ one-representing signals and $120 \sqrt{2}$ zero-representing signals. For all shift registers shifting in the other direction, there would be $120 \sqrt{2/3}$ one-representing signals and the same number of zero-representing signals. The 15° and 75° screens are mirror images and the choice of directions for the different pulse lengths decides which of the two screen angles will be produced. For a 45° screen, all shift registers would include $60 \sqrt{2}$ one-representing signals and $60 \sqrt{2}$ zero-representing signals.

With regard to shift rates, the unit has a value which depends on the film velocity and the screen ruling required. For a 90° screen, the shift rate is one unit for all shift registers; for 15° and 75° screens, the shift rates are $\sqrt{3}$ units (for $120 \sqrt{2}$ signals) and $1/\sqrt{3}$ units (for $120 \sqrt{2/3}$ signals). The 45° case has been discussed above.

I claim:

1. Apparatus for making a screen reproduction of an image, including a row of light source elements for exposing, in combination, a line across a component screen area of a sheet or plate to be exposed, and an electronic screened-image signal generator operative under the effect of an image-representing signal to control the illumination of the light source elements, the screened-image signal generator comprising a pair of shift register devices, each storage location in one shift register device having a corresponding storage location in the other shift register device, means for moving trains of logic signals along the two shift register devices in opposite directions, means responsive to an image-representing signal to vary the length of the trains of local signals in the shift register devices, means responsive to the coincidence of logic signals in corresponding storage locations in the two shift register devices to develop a screened-image signal for that pair of locations, means for achieving relative movement between the said light source elements on the one hand and the sheet or plate on the other hand along successive scan lines in a direction at an angle to the said line across the component screen area, in synchronism with the movement of the trains of logic signals along the two shift register devices, and means for applying resultant screened-image signals to the said light source elements during such relative movement whereby the component screen area of the sheet or plate is exposed scan line by scan line.

2. Apparatus in accordance with claim 1, in which each shift register device comprises two shift registers having corresponding binary storage locations, said corresponding binary storage locations in the shift registers of each device also corresponding to storage locations of said device, means for stepping the binary values in the shift registers in the same sense, and means for detecting when corresponding binary storage locations in the shift registers have binary values in given relationship and for generating a logic signal of one type for the corresponding locations of the shift register device and for generating a logic signal of another type when the values in the corresponding locations do not have the said given relationship.

3. Apparatus in accordance with claim 2, in which the means responsive to the image-representing signal varies the relative phase of data in the said two shift registers constituting a single shift register device, whereby the ratio of logic signals of one type to logic signals of another type for the shift register device is varied in accordance with the amplitude of the image-representing signal.

4. Apparatus in accordance with claim 2, in which the said means for detecting the given relationship between corresponding storage locations in the two shift registers includes a plurality of exclusive-OR gates.

5. Apparatus in accordance with claim 1, in which each shift register is of the circular kind.

6. Apparatus in accordance with claim 1, including a second pair of shift register devices, each pair of corresponding storage locations in one pair of shift register devices, jointly with pair of storage locations in the second pair of shift register devices, providing a screen-representing signal for the control of a single light source element, the pairs of shift register devices being arranged to supply their illumination-control signals alternately.

7. Apparatus in accordance with claim 1, further including, for making a screened reproduction of an image with a 45° angle, means whereby the shift rate for one of the shift register devices is zero and the shift rate for the other of the shift register devices is one step for each unit of relative movement between the light source elements and the sheet or plate, and further including means for developing screened-image signals for successive lines of the component screen area, the said signal-developing means being operative, when a predetermined location of the second shift register device stores a one-representing signal, to generate a screened-image signal for each location of the first shift register device which stores a one-representing signal.

8. Apparatus in accordance with claim 1, wherein the outputs of the shift-register devices are combined to produce a number of screened-image signals greater than the number of light source elements, and in which a group of screened-image signals is combined to control each light source element.

* * * * *